Figure 1:
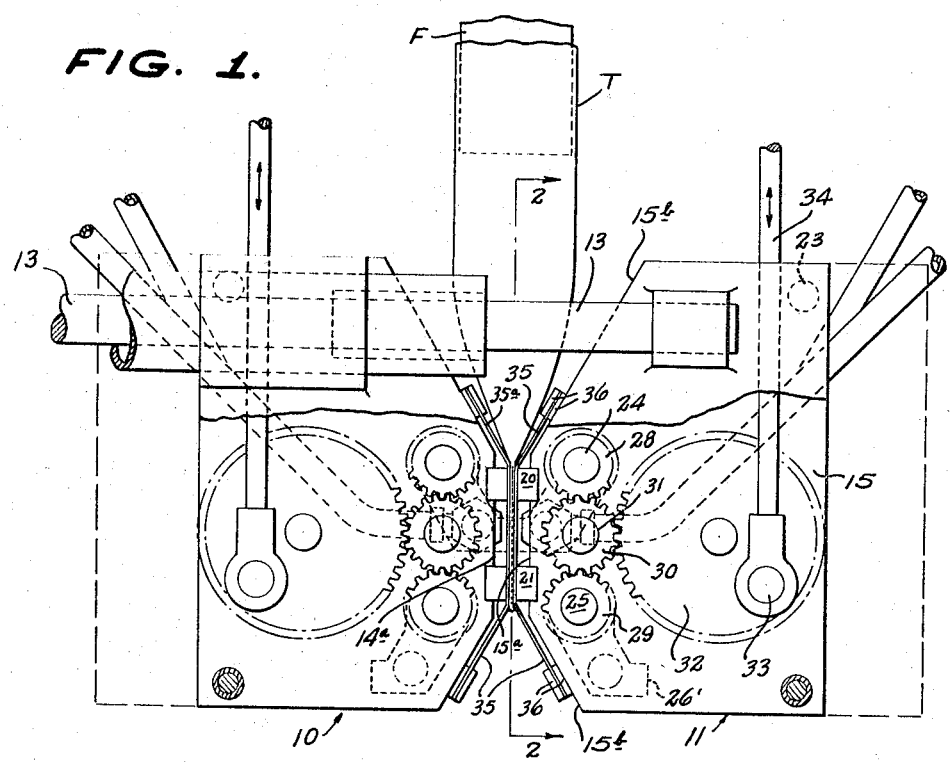

July 25, 1967    C. A. FRANK    3,332,204
SEALING MECHANISMS
Filed April 6, 1962    7 Sheets-Sheet 1

INVENTOR.
CARL A. FRANK,
BY
ATTORNEYS.

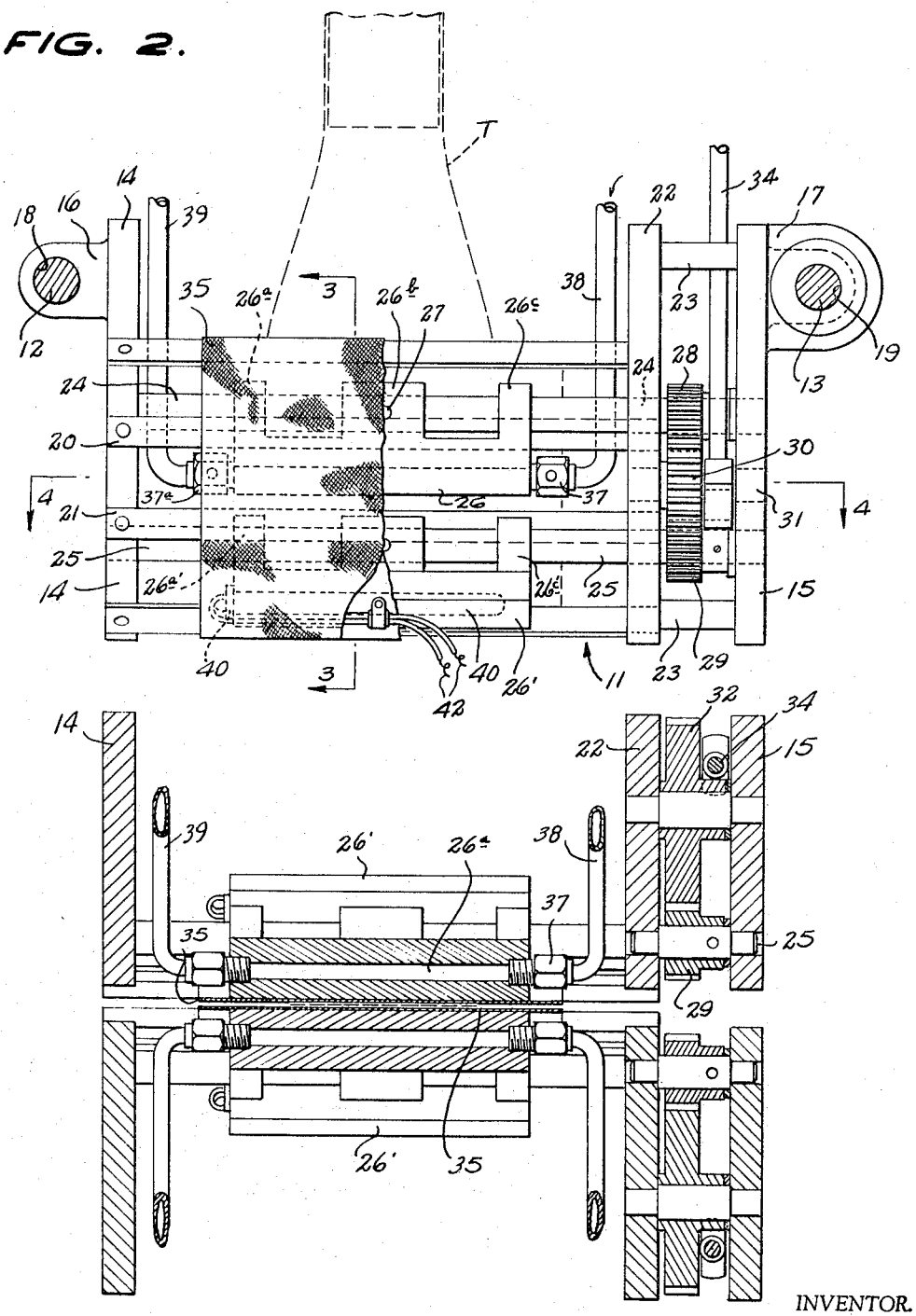

July 25, 1967

C. A. FRANK 3,332,204

SEALING MECHANISMS

Filed April 6, 1962

7 Sheets-Sheet 3

INVENTOR.
CARL A. FRANK,
BY

July 25, 1967  C. A. FRANK  3,332,204
SEALING MECHANISMS
Filed April 6, 1962  7 Sheets-Sheet 4

INVENTOR.
CARL A. FRANK,
BY
ATTORNEY.

July 25, 1967  C. A. FRANK  3,332,204
SEALING MECHANISMS
Filed April 6, 1962  7 Sheets-Sheet 5

INVENTOR.
CARL A. FRANK,
BY
ATTORNEY.

July 25, 1967  C. A. FRANK  3,332,204
SEALING MECHANISMS
Filed April 6, 1962  7 Sheets-Sheet 6

INVENTOR.
CARL A. FRANK,
BY
ATTORNEY.

July 25, 1967  C. A. FRANK  3,332,204
SEALING MECHANISMS
Filed April 6, 1962  7 Sheets-Sheet 7
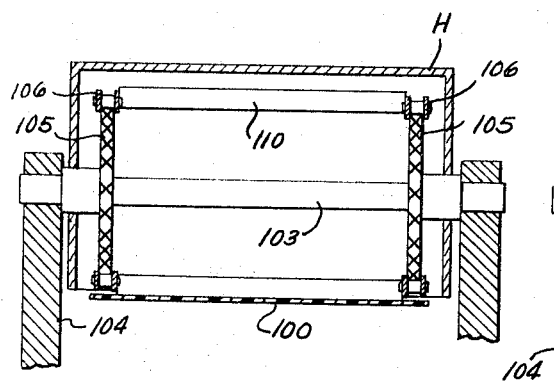
FIG. 16.
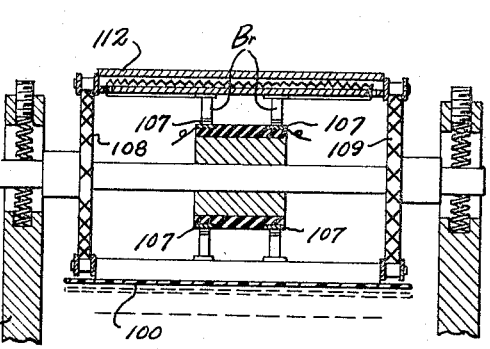
FIG. 17.
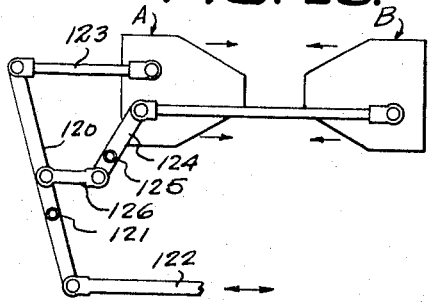
FIG. 18.
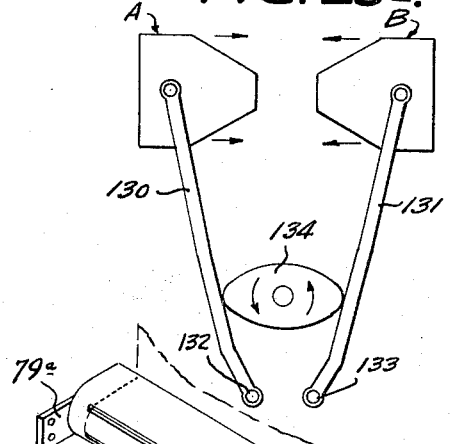
FIG. 18a.
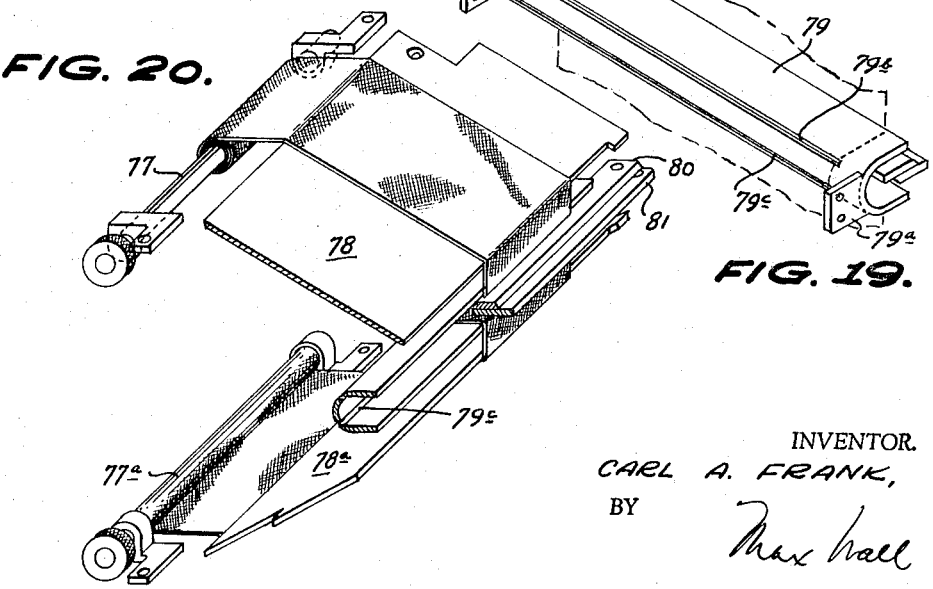
FIG. 20.
FIG. 19.
INVENTOR.
CARL A. FRANK,
BY Max Hall
ATTORNEY.

United States Patent Office 3,332,204
Patented July 25, 1967

3,332,204
SEALING MECHANISMS
Carl A. Frank, 585 Piermont Ave.,
Rivervale, N.J. 07675
Filed Apr. 6, 1962, Ser. No. 185,565
15 Claims. (Cl. 53—180)

This invention relates to heat sealing of heat sealable materials such as the thermoplastics polyethylene, polypropylene, Pliofilm, Vinylite, Koroseal, heat sealing cellophane and others, including non-plastic sheets having a thermoplastic coating or backing. The invention relates more particularly to a new method and apparatus for making continuous effective seals on such thermoplastic materials, and making them more quickly, efficiently, and permanently than has heretofore been possible.

Various means have been used in the packaging and sealing industry for many years to make seals on materials of the kind mentioned above, but all have had their faults and are subject to objection of one kind or another. More recently, it has been proposed to seal such materials by subjecting them to high radio frequency impulses and then cooling the treated portions. The impulse heat so supplied to the materials to be welded or fused together was of very short duration, but the cooling of the seal took considerable time and slowed production. Further, it was found that the application of high impulse heat caused the material acted upon to become sticky and to adhere to the dies, so the use of a glass fabric shield or shroud became prevalent between the dies and the heat bars to support the plastic materials until cool to prevent the conditions caused by the stickiness of the material when fused. Cooling of the shroud or shield further delayed production. Another objection to the impulse method is that the heating element, being highly heated and quickly chilled or cooled at rapid intervals, had an extremely short life due to severe crystallization of the metal and required frequent replacement.

One principal object of the present invention is to eliminate the foregoing difficulties and to provide a sealing mechanism which will effectively heat to a fusing temperature the material worked upon, and will quickly chill or cool it without subjecting said mechanism to any unusual wear and tear, and which will have a long, stable and effective life.

Another object of this invention is to provide separate means for heating the work and separate means for chilling it, these means being kept constantly and continuously hot and cold, respectively, throughout the operation of the machine. The work is kept under pressure both while being heated and chilled, the pressure being applied either by a heated shroud alone, or by a heated shroud in conjunction with the hot and cold bars, alternately applied.

A further object is to provide a mechanism in which the hot bars may be applied to the work to bring it to welding or fusing temperature quickly, said hot bars being automatically withdrawn from the work as the cold bars are applied, without any appreciable time lag between the intervals. When thermoplastics of the kind mentioned are heated to welding temperature, they become unstable and will break down unless supported. According to this invention, the materials are fully supported during the heating and cooling cycle both by a shroud or shield and by the heating and cooling bars.

Figure 3:
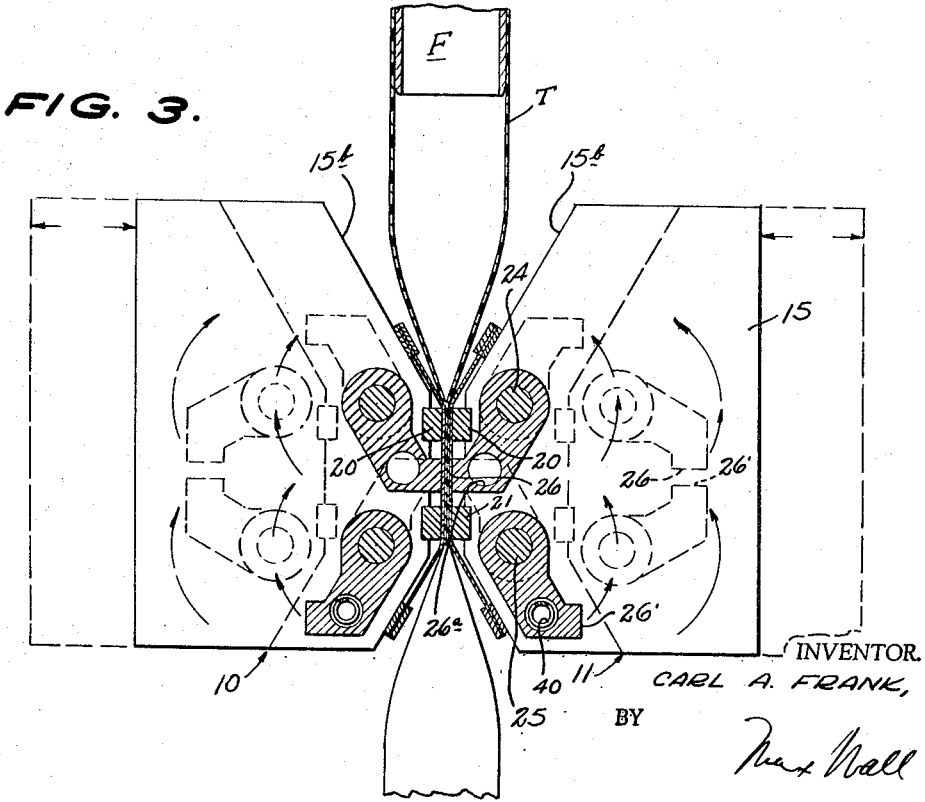
Figure 6:
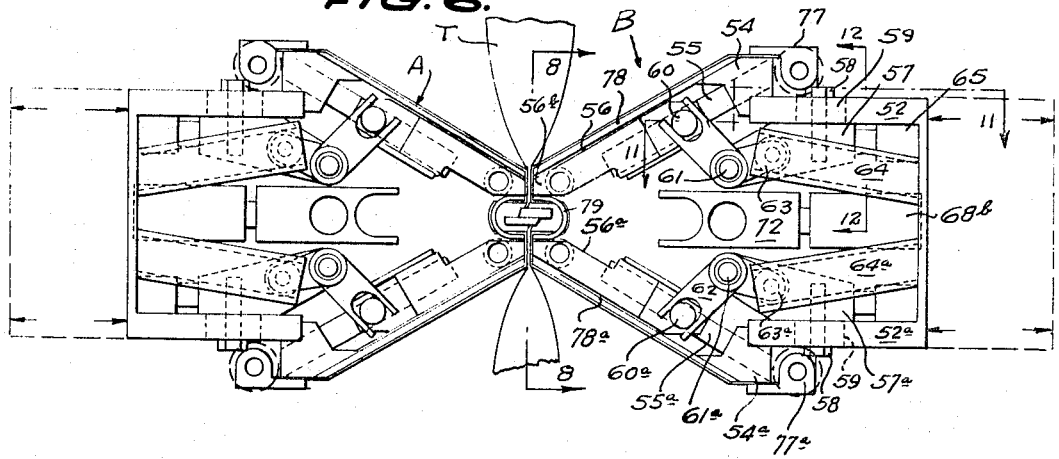
Figure 5:
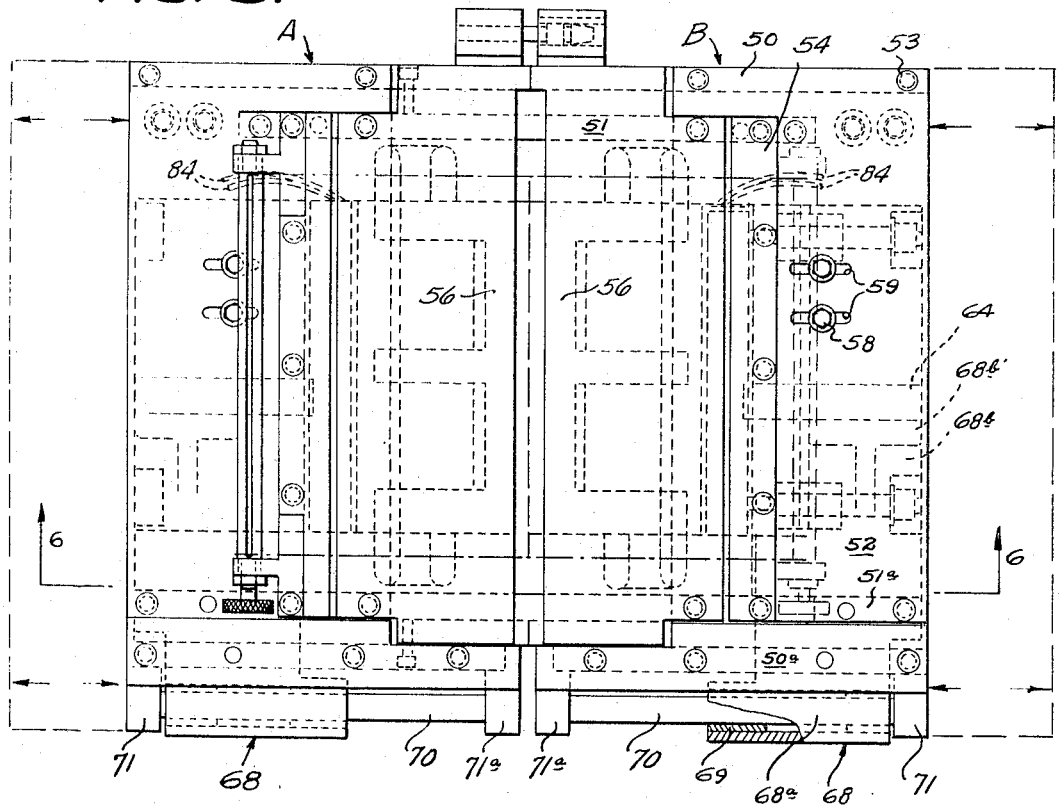
Figure 7:
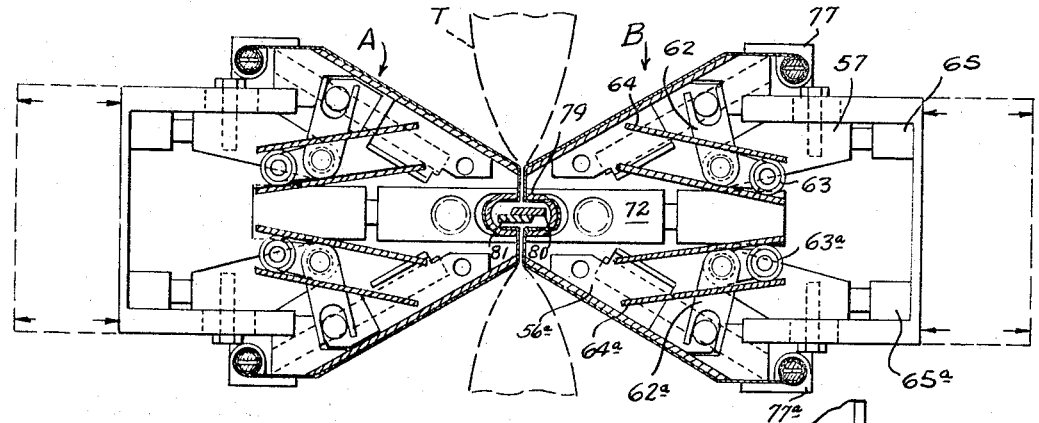
Figure 11:
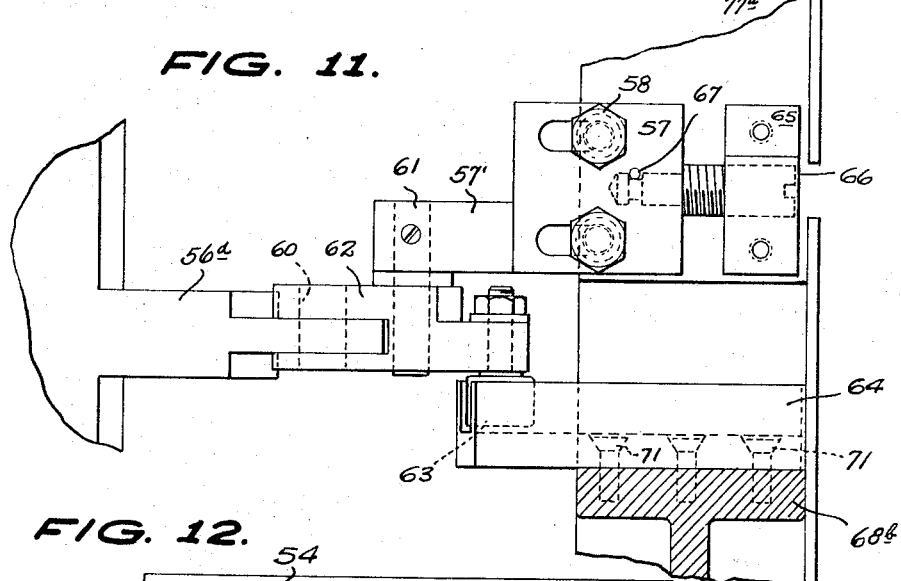
Figure 12:
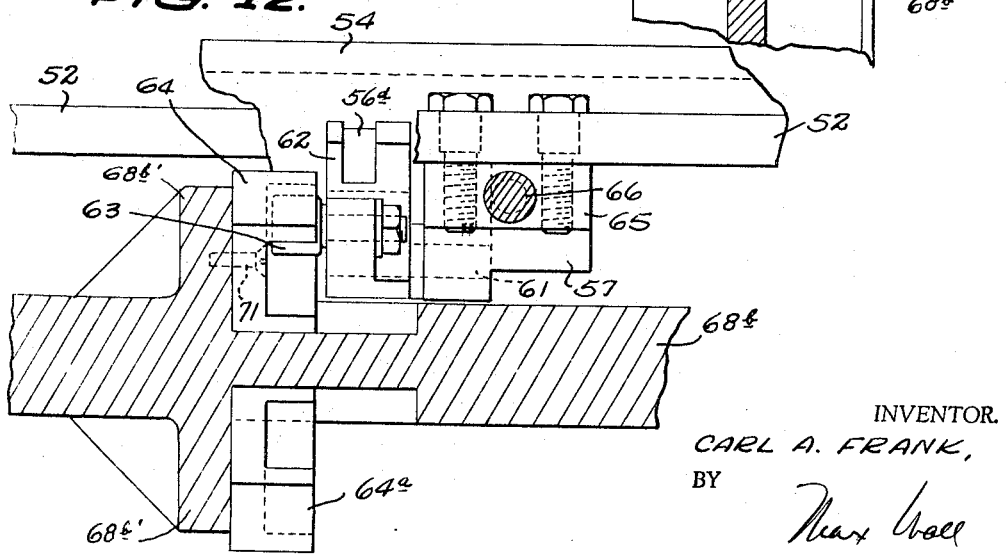
Figure 8:
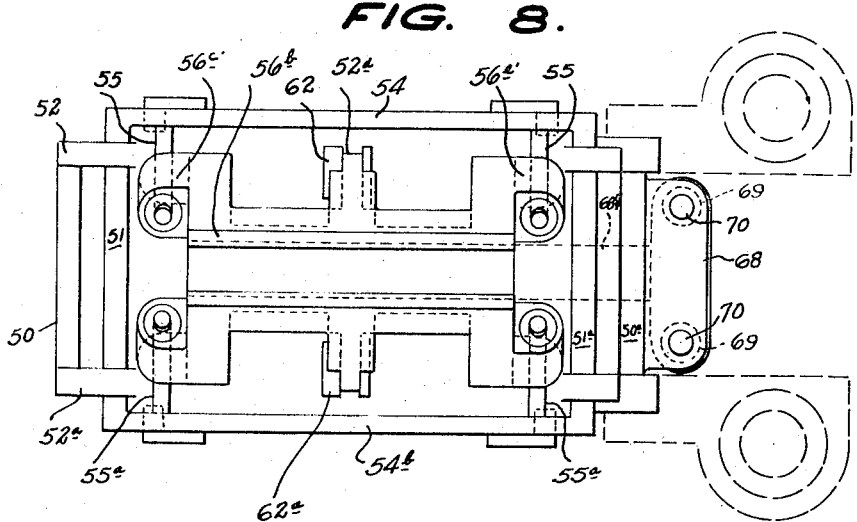
Figure 9:
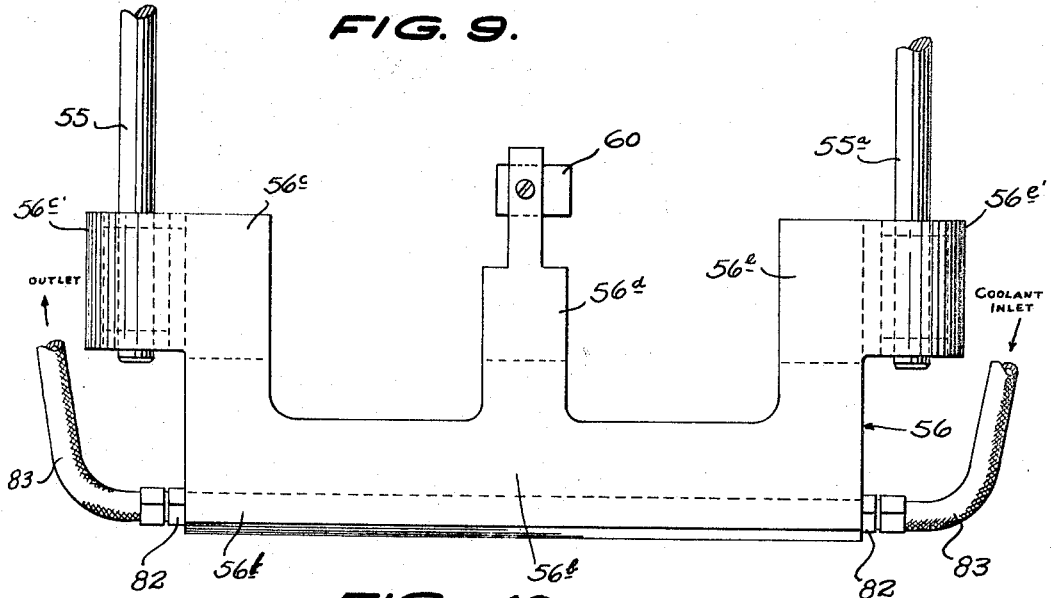
Figure 10:
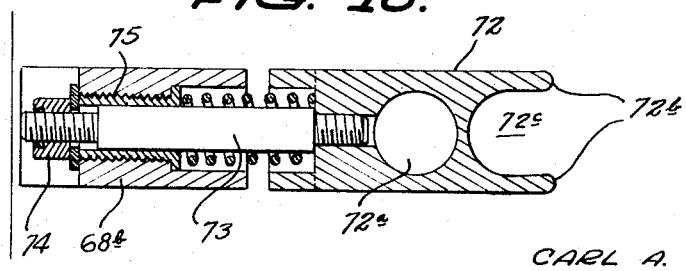
Figure 13:
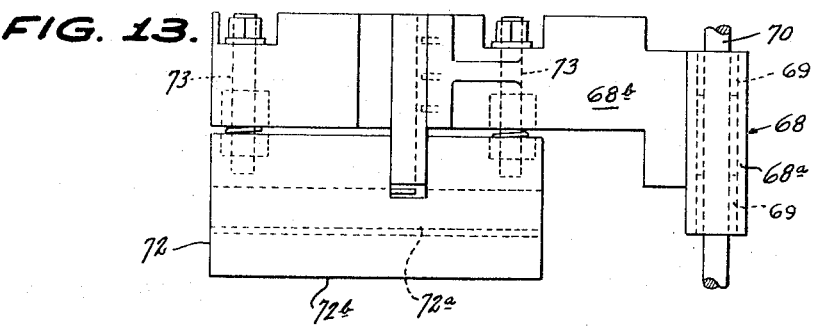
Figure 14:
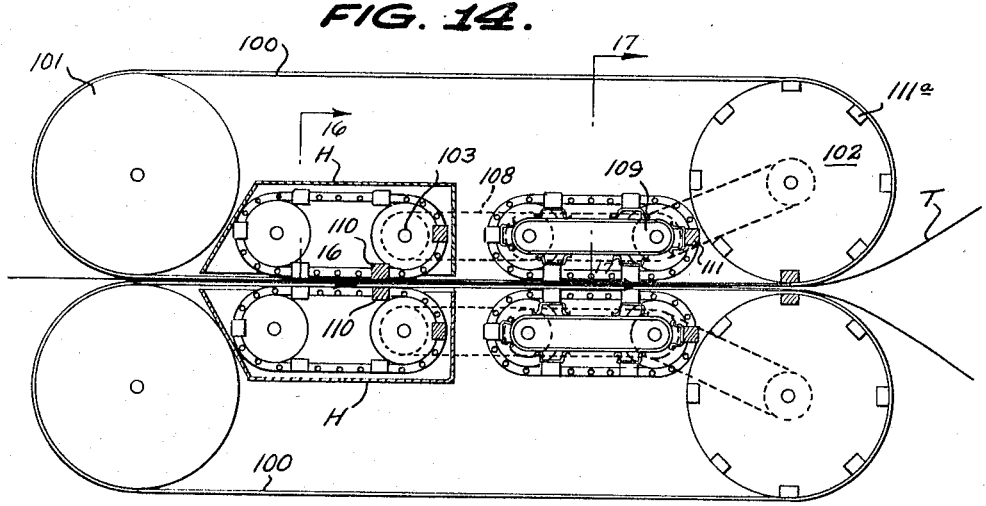
Figure 15:
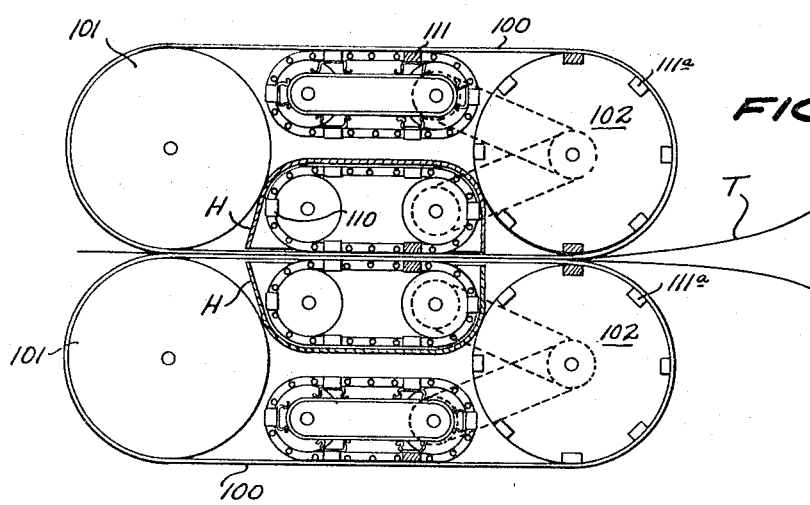

The invention may be practiced in various ways, and several illustrative modifications are shown according to the accompanying drawings and specification, wherein FIGURE 1 is an end elevation of a pair of sealing jaws.
FIGURE 2 is a front elevation of one of the sealing jaws, taken along the line 2—2 of FIGURE 1.
FIGURE 3 is a section taken along the line 3—3 of FIGURE 2.
FIGURE 4 is a section taken along the line 4—4 of FIGURE 2.
FIGURE 5 is a plan view of a modified form of the invention.
FIGURE 6 is a view taken along the line 6—6 of FIGURE 5, with the cold bars in the cooling position.
FIGURE 7 is a view similar to FIGURE 6 with the cold bars withdrawn and the hot bar shown in heating and sealing position.
FIGURE 8 is an elevation taken along the line 8—8 of FIGURE 6.
FIGURE 9 is an enlarged plan view of the cold bar.
FIGURE 10 is an enlarged section through the hot bar.
FIGURE 11 is a detail showing a means of adjusting the pivot of the bell crank lever.
FIGURE 12 is a view taken along the line 12—12 of FIGURE 6.
FIGURE 13 is a plan view of the crosshead showing the hot bar attached.
FIGURE 14 is a view of another modified form of the invention.
FIGURE 15 is similar to FIGURE 14 but shows a rearrangement of parts.
FIGURE 16 is a section taken along the line 16—16 of FIGURE 14.
FIGURE 17 is a section taken along the line 17—17 of FIGURE 14.
FIGURE 18 shows one means of actuating the jaws from the operating mechanism of the machine.
FIGURE 18a shows another operating mechanism.
FIGURE 19 is a detail in perspective of one of the shroud supports.
FIGURE 20 is a perspective detail of the manner in which the shroud is supported on the jaws.

The invention comprises a pair of complementary jaw assemblies 10, 11, FIGURE 1, which reciprocate towards and away from each other on oppositely disposed rails 12, 13, to open and close on the material to be sealed, which may be two webs, a tube or on folded lengths of flexible thermoplastic material, to form a cross seal or a seal which is transverse to the longitudinal axis of the material being sealed, for packaging purposes. Since each jaw assembly is identical, only one will be described. They each comprise a pair of end plates 14, 15, FIGURE 2, having outwardly extending ears 16, 17, respectively, the ears having anti-friction bores 18, 19, which receive the guide rods 12 and 13 for sliding or reciprocating movement. The guide rods are fixed in any suitable manner to the frame (not shown) of the machine.

These end plates are spaced from one another and are tied together by cross bars 20, 21, which project outwardly from the facing edges 14a, 15a of the end plates, as shown in FIGURE 1. A support plate 22, FIGURE 2, is positioned between the two end plates, closely adjacent plate 15, and is tied thereto by a series of spacing pins 23. Mounted for rotative movement in the end plates are a pair of parallel shafts 24, 25, positioned one directly above the other. Each shaft supports a thermally controlled sealing bar unit comprising a contact or pressing face portion 26, FIGURE 3, having rearwardly and upwardly extending arms 26a, 26b, 26c, FIGURE 2, which are each bored to receive the shaft upon which each is mounted. Only the central arm 26b is fixed to the rod 24 by means of a set screw 27, leaving the arms 26a, 26c free to move laterally on the shaft due to thermal expansion caused when the contact bar is heated or cooled as the case may be.

A set of gears for driving the sealing bars is mounted on the shafts between the plates 22 and 15. A gear 28 is suitably fixed on the shaft 24, a gear 29 is similarly fixed on the shaft 25, and an intermediate, meshing, idler gear 30 is positioned between the two, being mounted on a rotative shaft 31, likewise supported between plates 15 and 22. A pin 33 is fixed to and projects from a side of the driving gear 32 adjacent its periphery and an arm 34 is connected to the pin, the arm being driven through a relatively short stroke from a cam or other driving means (not shown) on the machine. Rotation of the driving gear 32 will rotate the hot and cold bars into operating position as will hereinafter be explained.

The facing edges of each plate 14 and 15 (FIGURE 1) are cut away at the upper and lower corners to provide sloping surfaces, as at 15b, and these surfaces terminate in the vertical plane portions or edges 14a, 15a, which provide the surfaces on which bars 20, 21 are supported. A shroud or shield 35 comprising a sheet of heat transfer material is tightly stretched over the bars 20, 21 and is clamped at each end between clamping bars 36 fixed to the upper and lower sloping surfaces 15b. Fiber glass cloth, Teflon coated (polymerized tetrafluoro-ethylene), has been found to be suitable for this heat transfer material, but any suitable flexible material which will hold heat for a short period will be satisfactory.

While the structure of each of the thermally controlled sealing bars is substantially the same as described above, one is a hot bar and one is a cold bar. For illustrative purposes, the upper one 26, FIGURE 3, is shown as a cold bar and the lower one 26' as a hot bar. That portion of the cold bar adjacent the pressure face thereof, designated by the numeral 26, is provided with a passage 26a throughout its length to receive a flow of a coolant fluid. The passage at each end of the bar is threaded to receive a swiveling fitting 37, 37a, FIGURE 4, respectively. A supply hose 38 is connected to the fitting 37 at one end of the bar, the other end having a fitting 37a connected to a discharge hose 39. The cold bar has tendency to contract somewhat under the influence of the coolant material, but due to the fact that the ears 26a, 26c are freely mounted on the rod 24, the contraction and subsequent expansion may take place without damage to the bar.

As indicated above, the lower, hot bar unit 26' is structurally similar, but a heating cartridge 40 is inserted into the passage in the bar, the cartridge preferably being one capable of producing a relatively high degree of heat to heat the bar quickly. Under the influence of this high temperature, the bar has a tendency to elongate slightly and may do this without warping or buckling because the end ears 26a', 26c' are freely mounted on the rod 21 and may expand in a lateral direction without restriction. Likewise, it may cool and contract freely and without warping, cracking or otherwise becoming damaged.

In the operation of the apparatus, heat is applied to the cartridge 40 by means of a connection 42, FIGURE 2, with a suitable source of electric current and the heat is continuously maintained in the bar. Coolant is continuously supplied to the cold bar through hose 38 and discharged through hose 39. Although in FIGURES 1 and 2, the jaw assemblies 10 and 11 are shown as closed with the cold bars pressing against the shroud 35, the actual operating cycle of the machine would begin with the jaws open and the hot bars pressing against their respective shrouds, with the cold bars in their inoperative position. It is important that the hot bars and the shrouds be preheated before sealing is attempted.

For the purposes of illustration, flexible thermoplastic material T will be brought down from the feed tube F into position between the jaws of the sealing mechanism and will be connected with the material advancing mechanism (not shown) of the machine. It will be understood that the mechanism described is not limited in its use to tubular material, as it may as well be used to seal material which is formed of a folded web as shown in the patent to Bartelt, No. 2,649,674, or to seal together two separate webs of adjacent material.

With the material to be sealed in position between the jaw assemblies, the machine is started, causing the jaws 10, 11 to close on each side of the material T, with the hot bars in contact with the shrouds, applying a high degree of heat to the tube T through the shrouds 35, 35a. The time period for which the jaws are closed to heat and weld the material to be sealed depends largely upon the thickness and nature of said material. Assuming that a relatively thin material of about .0005 mil is to be sealed, the heating period may be that just sufficient to bring the hot bars together and to separate them. For a thicker material the duration may be greater. Once the hot shroud is brought into contact with the tube T, the material of the tube T will be highly heated and softened so as to fuse together, under the welding temperature. To maintain the weld, a cooling medium must be applied to the welded area. Therefore, immediately after the hot bars 26' applied their heat and pressure to the tube through the shroud, the operating cycle of the machine is such that the operating rod 34 is actuated so as to rotate the gear 32 clockwise, causing idler gear 30 to rotate gear 28 clockwise, withdrawing the heating bars 26' from the shroud and simultaneously therewith rotating the cold bars 26 into contact with the shroud to cool the welded area of the tube. The operating cycle of the machine now continues and opens the jaw assemblies 10 and 11. As the jaws move to the open position, the operating bar is again cycled to rotate the gears 32 and 28 counter-clockwise to withdraw the cold bars 26 from their respective shrouds and rotate the gear 29 counter-clockwise to reapply the hot bars 26' to preheat the shrouds during the opening period of said jaws, repeating the cycle. In this manner, the shroud is constantly maintained in a heated condition to accelerate the cycle for welding and sealing.

It is important to note here that the movement of the hot and cold bars may coincide with the movement of the jaws, or be independent thereof. When sealing very thin materials, it may be sufficient to heat the shrouds and accomplish the softening of the material to welding heat merely by bringing the jaws together and pressing the opposite shrouds against the work, and thereafter applying the cold bars to the heated area.

The apparatus of one modified form of the invention comprises (FIGURES 5–13) a pair of reciprocating jaw assemblies A and B which move towards and away from each other in response to the actuating mechanism of the machine. Each jaw is a duplicate of the other in reverse, so a description of one will suffice. Each jaw embodies a frame having spaced side or end plates 50, 50a and intermediate supporting, parallel plates 51, 51a, FIGURE 5, connected by upper and lower plates 52, 52a, FIGURE 6, respectively, all suitably bolted together together as by machine screws 53. A bar 54 (FIGURE 6 and 12) of irregular shape is bolted to the upper plate 52 and a similar bar 54a is bolted to the lower plate 52a. Each bar 54, 54a carries a pair of hardened guide rods 55, 55a respectively, fixed thereto, one rod at each end of the bar, the rods being angularly inclined towards one another at their free ends. A cold bar 56, 56a, respectively, is mounted to reciprocate on each pair of hardened guide rods. Each cold bar comprises a length of metal 56b (FIGURE 9), preferably aluminum, which has three rearwardly extending arms 56c, 56d and 56e. The outer arms 56c and 56e have outwardly extending bosses or ears 56c' and 56e', these ears being bored to receive the guide rods 55, 55a. The center arm 56d of each cold bar carries a cross pin 60, for a purpose about to be described.

Each upper and lower plate 52, 52a carries a block 57, 57a, respectively, which is fixed to the plate by machine screws 58, the plates being slotted as at 59 to permit forward or rearward adjustment of the blocks. Each block has a forwardly extending arm or extension 57' which supports a cross pin 61, 61a, respectively, each pin carrying a bell crank lever 62, 62a, respectively, one leg of each crank lever being slotted on its end, extending towards and receiving the cross pin 60 of the center arm of the cold bar. The other leg of each bell crank lever extends rearwardly, and carries a roller 63, 63a, respectively, which engages a cam guide 64, 64a respectively, about to be described.

Rearwardly of the block 57, as best shown in FIGURE 11, and below the upper plate 52, a block 65, FIGURES 6 and 7, is fastened to the plate 52 by machine screws. This block has a threaded bore which receives a threaded adjusting screw 66, this screw extending through the block 65 and into the block 57. The end of the screw 66 has a peripheral groove which receives a pin 67, to lock the block 57 to the screw for adjustable movement. Rotation of the screw 66 will move the block 57 forwardly or rearwardly to adjust the position of the cold bars on their guide rods 55, 55a by means of the bell crank levers. Once the cold bars are adjusted to their desired positions (so that they contact the shrouds when extended), the machine screws 58 are tightened to lock the block 57 with respect to the plate 52. The hot bars are similarly adjusted.

The cam guides 64, 64a comprise channel shaped members which are carried by a carriage member 68, FIGURES 5, 8 and 13, this being substantially a T-shaped member having a crosshead 68a and an integrally extended leg 68b. The crosshead is bored at each end to receive bushings 69 which slide on hardened guide rods 70. The guide rods 70 are supported, one above the other, in spaced ears 71 integrally formed with the end plate 50a, as shown in FIGURE 5. The leg 68b of the crosshead extends into a cavity in each jaw assembly from one side thereof and rides in the cavity between the upper and lower cold bars. The leg of the crosshead has an integral flange 68b', FIGURE 12, extending above and below it and the channel member cam guides 64, 64a are secured to this flange by screws 71, each channel guide member being arranged at an angle with respect to its carrier, the angle being shown in FIGURES 6 and 7.

The rollers 63, 63a, respectively, on the rear legs of the bell crank levers engage in the runways of the channel members to actuate the bell crank levers in a manner to be explained, as the crosshead is reciprocated on the guide rods 70.

The hot bar 72, shown in cross-section in FIGURE 10, comprises a bar, preferably of a good heat conductive metal, extending substantially across the width of the jaws A and B. It is bored along its length at 72a to receive the cartridge heater unit and is bifurcated along its leading edge to provide upper and lower heating lips 72b outlining a mouth or central cavity 72c. At its rear end it is yieldably connected to the leg 68b of the crosshead 68 by means of two spaced stud bolts 73, the rear end of the stud bolt projecting through the leg 68b of the crosshead and being secured by a nut 74. The leg 68b is bored and threaded to receive a threaded bushing 75. A compression spring 76 is mounted on each stud bolt and is interposed between the leg 68b and the hot bar 72 for the purpose of adjusting the pressure of the hot bar as desired, by means of the adjusting bushing 75.

The front or operating face of each jaw assembly A and B is covered with a shield or shroud of a fabric which has previously been described. Such a fabric of a width coextensive with the width of the sealing jaws is draped over each sealing jaw. This is accomplished by providing an upper and lower support mechanism 77, 77a, FIGURE 6, respectively, containing reels (not shown) to support the fabric, the fabric being supplied from the lower reel 77a, passed over the operating face of each jaw and wound up on the upper reel 77. The purpose of passing the fabric from the lower to the upper reel is to present a clean surface to the jaws, the surface of the fabric under the jaws being free of deposited dust, which would quickly collect on the upper surface. Attached to the upper and lower bars 54, 54a and extending downwardly over the cold bars 56, 56a, is a thin, rigid cover plate 78, 78a, covering, respectively, the upper and lower sloping plane of each jaw assembly. The space between the cold bars as shown in FIGURE 6 at the forward portion of each jaw assembly is occupied by a U-shaped support member 79 which extends across the width of said jaws. Said support, FIGURE 19, has tabs 79a struck from it at each end by means of which the support is secured to the intermediate plates 51, 51a. The support has upper and lower longitudinal slots 79b and 79c, respectively, cut into it.

The glass fiber cloth passes, FIGURE 20, from the lower reel over the lower shield 78a, across the front of the lower cold bar 56a, up and into the mouth 79d of the support member, through the lower slot 79c, over the back of the support member, through the upper slot 79b, and out of the mouth 79d, over the edge thereof and upwardly past the upper cold bar, over the upper shield 78 to the reel support housing 77 where it is wound up on the reel.

An indexing mechanism (not shown) may be connected to the reel mechanism so as to index the reel one step each time the jaw assemblies are opened, thereby presenting a new fabric area to the hot bar at each cycle of operation. However, this may be omitted and the reels operated manually to present a new working surface only when the glass fabric shows signs of wear.

A scissors blade or knife 80, 81, respectively (FIG. 7), is mounted on each jaw, respectively, within the mouth of the U-shaped shroud support 79, and they are so constructed and arranged as to overlap one another when the jaws A and B are in closed position to effect a scissors cutting action on the sealed web, as best seen in FIGURE 6. Each blade 80, 81 is supported on an end wall of its respective jaw assembly.

In the practice of this modification, the jaw assemblies A and B are reciprocated by the operating mechanism of the machine, and since this mechanism forms no part of the invention, it will not be described. The operation is initiated with the jaw assemblies open, packaging material to be sealed disposed between them and connected to the feeding means which advances the material step by step as the seals are made. In the retracted position of the jaws, the glass fabric shroud is in contact with the hot bar on each side of the packaging material, and is thus preheated. When the pulling of the packaging web has reached the limit of its stroke, the jaws are closed on the web bringing the hot shrouds, backed by the hot bars, into contact with the packaging web and fusing the heated portions. This contact is maintained only long enough to raise the temperature of the material to the fusing point and is practically instantaneous. Depending on the thickness and nature of the material being sealed, the machine can be cycled so that it can be adjusted to give varying dwell periods to maintain the jaw assemblies closed. As the jaws open, the crosshead 68 is moved rearwardly by the ears 71a on the end plate 50a, simultaneously throwing the cold bars forward into pressure position against the shroud, to instantaneously chill it and the fused area of the packaging material in contact with it.

The hot and cold bars are formed of a mass of a suitable heat exchange material which is effective to retain heat and cold respectively. The cold bars 56, 56a are each bored longitudinally, FIGURE 9, at 56f, each end of the bore being threaded to receive fittings 82 to which flexible hoses 83 are connected. The hose at one end is connected to a source of a coolant which is pumped through the cold bar and recirculated through a chilled reservoir. Thus, the cold bars are kept in a chilled condition constantly throughout the operation of the machine.

The hot bar is heated by an inserted resistance heater unit (not shown) connected by leads 84 (FIG. 5) to a source of electric current and is controlled by a thermostat (not shown). It is customary to turn the heaters on for a period of time prior to the operation of the machine to preheat the hot bar to the desired temperature. It is not always necessary to have the hot bar in contact with the shroud in order to raise the web of packaging material to fusing temperature. This can be accomplished by preheating the shroud while the jaws are open, the shroud being placed in contact with the hot bar, and then closing the jaws, leaving the hot bar retracted to bring the opposite, heated shroud portions into intimate pressure contact with the material, thereby fusing said webs. This takes place almost instantly, and the cold bars are brought into contact with the shroud practically simultaneously, chilling it and the fused joint in contact with it, thus completing the seal. The coolant, being constantly circulated through the cold bars, dissipates any heat they may have absorbed from the heated shroud.

In practicing this mode of operation, the cold bars and the hot bars 72 have been precooled and preheated, respectively, and the jaws are open, with the material to be sealed passing between them. In the open condition of the jaws, the hot bar is pressed against the shroud to preheat it to a degree of heat sufficient to fuse the webs, but because of the poor conductive nature of the shroud, the heat is concentrated on said shroud only along the area of contact with said hot bar. This forms substantially two lines of heat on said shroud, which lines are maintained in said heated condition when the hot bar is withdrawn from the shroud, because the fabric of the shroud is a poor conductive material.

These actions are accomplished by means of the mechanism described, whereby when the jaw assemlies A and B move to the closed position, with the hot bar 72 stationary, the channel guides 64, 64a will cause the bellcrank levers 62, 62a to rotate about their pivots 61, 61a, causing the bifurcated legs of these levers to act on the cross pins 60, 60a to throw the cold bars forward on the guide rods 55, 55a into pressure contact with the shroud. After the seal has been accomplished, the web cut, and the jaws opened, the channel guides 64, 64a cause the bell crank levers to oeprate in a reverse direction, withdrawing the cold bars into the jaws, and bringing the shroud back into intimate contact with the hot bar. The knives 80, 81 cut the web as the jaws close. This completes one cycle of operation.

Where working with materials of varying thicknesses, or having properties or characteristics which vary with the nature of the material, different heating periods are required to form effective seals. In another mode of operation, therefore, a longer dwell period may be required for the jaws to remain closed in order to effect a proper seal. In this mode of operation, the hot bars 72, carried by their respective crossheads 68, are moved forward simultaneously with the jaw assemblies as the jaws are closed, thereby applying heat and pressure to the shroud and web. Having previously established, by trial and error, the length of time required to make an effective seal on a particular kind of material, the machine is cycled to allow a dwell period for the hot bars in closed position sufficient to soften the web, and for the cold bars to complete the seal. During this dwell period, with the jaws still in closed position, the hot bar is withdrawn from the shroud by moving the crossheads 68 rearwardly, thereby simultaneously throwing the cold bars into intimate pressure contact with the shroud and web to complete the seal as heretofore described.

Although the jaw assemblies A and B may be driven from the operating mechanism of the machine in any suitable manner, FIGURE 18 shows a simple form of mechanism for accomplishing this result. In this arrangement, a lever 120 is pivoted to the frame of the machine at 121. One end of this lever is connected to a link 122 which may be driven from the operating mechanism of the machine and the other end is connected to a link 123 pivoted to the frame of jaw A. Another lever 124 is pivoted at 125 to the frame of the machine, this lever being arranged adjacent lever 120, and connected thereto at one end by a link 126. The other end of lever 124 is pivoted to a link 127 which is pivotally connected to the jaw B. It will be clear to those skilled in the art that actuation of the lever 122 will simultaneously operate levers 120 and 124 to drive links 123 and 127 in opposite directions, thereby operating the jaws A and B to open and close.

In FIGURE 18a, a modified form of drive is shown in which levers 130, 131 are pivoted at one end at 132, 133, respectively, to the frame of the machine and at the other end to the jaws A and B, respectively. These levers are driven from the operating mechanism of the machine by a cam 134 as shown.

In another modification, the sealing is accomplished by endless belts in a continuous operation to produce spaced seals on a continuous web, rather than in the intermittent operation heretofore described. In this modification, the Teflon coated glass fabric is in the form of an endless belt 100 mounted on spaced drums 101, 102, driven in any suitable manner well known in the art, the drums being suitably supported on a table or machine base (not shown). Within the endless Teflon coated belts, a pair of smaller endless belt units are mounted, one carrying hot bars and the other cold bars to be used according to the teaching of this invention to heat, fuse and cool portions of thermoplastic materials to form seals. One of these units, FIGURE 16, comprises a shaft 103 suitably mounted in the frame 104 of the machine. The shaft carries a pair of sprocket wheels driven by chains 106 which support a plurality of cold bars 110, the bars being evenly spaced from one another about the chain. The bars are preferably solid masses of a metal of good conductivity. This unit is enclosed in a hood H which is well insulated, the interior of the hood being refrigerated to provde a cooling chamber for the cold bars.

The other unit, FIGURES 14 and 17, is a similar arrangement, without the hood, but having hot bars supported on the chain, these bars likewise being of a metal of good conductivity, and they are heated electrically by means of a plurality of buss bars 107 suitably supported between the chain sprockets 108, 109, the buss bars being connected to a source of electrical current (not shown). Each hot bar 111 is bored longitudinally to receive a cartridge heater 112, with connections to a pair of brushes B which are in electrical contact witth the said buss bars. The hot bars, as in the case of the cold bars, are evenly spaced from one another on the chain, and the spacing distance is identical with that of the spacing of the cold bars. The drive for the two units and for the Teflon coated fabric belt 100 is synchronized so that all belts are driven at the same speed. The structure just described is duplicated in another unit below it so that each Teflon coated belt of the apparatus is in pressure contact with the other as the belts are driven, and the webs of thermoplastic material are passed between them, as shown in FIGURE 14.

As the lead hot bar 111 comes into contact with the belt above and below the web of packaging material, the belt is heated along the area of its contact with the hot bar, and the heat is transmitted from the belt to each web, softening the packaging material to a fusing temperature, and this heat is maintained therein as the belt continues its movement, until the lead or first heated areas of the web passes beyond the travel of the bar, and shortly thereafter is brought under the pressure contact of the lead cold bar 110 of the upper and lower units, where the heated area on the web is chilled by the cold bars, and is maintained chilled until it passes beyond the travel of the cold bar.

If it were desired to preheat the Teflon coated fabric belts to any extent, this could be done by mounting additional hot bars 111a in the leading drum 102 of each upper and lower unit.

Changes may be made in the design, construction and arrangement of parts without departing from the spirit of the invention and, therefore, the invention is not to be limited to what is here shown and described, but only as indicated in the appended claims.

I claim:

1. A machine for sealing spaced portions of a length of layers of heat sealable material wherein the heat sealable material is intermittently moved past the sealing means, comprising a support, said heat sealable material being movable past said support, means for applying pressure on said heat sealable material against said support, a heat transfer means carried by said pressure applying means, means for heating said heat transfer means, means for moving said heating means into pressure contact with said heat transfer means to fuse said material, said moving means being operable to withdraw said heating means; a cooling bar for cooling said heat transfer means, said moving means being operable to apply said cooling bar under pressure to the heated area of said heat transfer means while said latter means is in pressure contact with said heat sealable means.

2. A machine for sealing spaced portions of a length of heat sealable material wherein the heat sealable material is moved past the sealing means, comprising a pair of heat sealing jaw assemblies, means for opening and closing said jaws, a heat transfer means for each jaw assembly supported between each jaw and said heat sealable material, heating and cooling bar means on each jaw for heating and cooling, respectively, an area of said heat transfer means, and means on each jaw for moving said heating and cooling bar means, sequentially, into and out of pressure contact with said heat transfer material.

3. A machine according to claim 1 in which said heating means is moved into pressure and heating position against said heat transfer material as said pressure applying means is withdrawn from said heat sealable material.

4. A machine according to claim 3 in which said moving means is operable to apply the cooling means to said heat transfer means while the heating means is being withdrawn therefrom.

5. A machine according to claim 1 in which said means for heating said heat transfer means is a heated bar pivoted on said pressure applying means, and is swingable into and out of contact with said heat transfer means.

6. A machine according to claim 1 in which said means for heating said heat transfer means is a heated bar movably secured on said pressure applying means, and is movable into and out of contact with said heat transfer means.

7. A machine according to claim 1 in which the heating means and cooling bar are simultaneously actuated to operative and withdrawn positions, respectively, with respect to said heat transfer means by said moving means.

8. A machine according to claim 1, in which said support carries a heat transfer means and is movable into and out of pressure contact with said heat sealable means.

9. Sealing mechanism for sealing layers of heat sealable materials comprising a pair of opposed jaws having heat applicator means including a heating shroud and a heating means therefor for softening said materials to fusing temperature when applied to said materials, cold applicator means for cooling the fused area through said shoud, means for supporting and operatively connecting said heat and cold applicator means on said jaws, and means for driving said cold applicator means and said heating means alternately into and out of pressure contact with said shoud in contact with said layers of heat sealable materials.

10. Sealing mechanism for sealing layers of heat sealable material comprising a pair of opposed jaws having heat applicator means for softening said materials to fusing temperature when applied to said materials, cold applicator means for cooling the fused area, means for supporting and operatively connecting said heat and cold applicator means on said jaws, and means for driving said applicator means alternately into and out of pressure contact with said layers of heat sealable materials, wherein each applicator means is pivoted on the supporting means and are connected by gears, and said driving means comprises a gear operating on said connecting gears to drive the supporting means for the respective heat and cold applicator means in opposite directions.

11. Sealing mechanism for sealing layers of heat sealable material comprising a pair of opposed jaws having heat applicator means for softening said material to fusing temperature when applied to said materials, cold applicator means for cooling the fused area, means for supporting and operatively connecting said heat and cold applicator means on said jaws, and means for driving said applicator means alternately into and out of pressure contact with said layers of heat sealable materials, wherein the applicator means are pivoted in spaced relation on parallel axes, each such means being gear driven, an idler gear positioned between the driving gears, and said driving means comprises means for driving the idler gear.

12. Sealing mechanism for layers of heat sealable materials comprising a pair of opposed jaws of similar construction having hot bars and cold bars movable with respect to said jaws, a shroud disposed over each of said jaws to engage the heat sealable material, each bar being movable, respectively, into heat exchange relationship with said shroud in contact with said materials to heat and cool same along the area of contact therewith, and means operable by the movement of one of said bars towards heat exchange relation with said shroud in contact with said materials to withdraw the other bar therefrom, each of said bars in turn contacting the same area of shroud contacting said materials.

13. Mechanism according to claim 9 wherein said cold applicator means comprises bars of heat exchange materials disposed on each side of said heat applicator means, said heat applicator means being positioned between them, each of said applicator means being movable to alternately engage substantially the same area of the heat sealable materials in heat exchange relation.

14. Mechanism according to claim 9 wherein said hot and cold applicator means are slidable on said jaws, said connecting means being so constructed and arranged that the movement of one of said heat and cold applicator means into operative position causes a withdrawal of the other.

15. A machine for heat sealing spaced regions on a continuously moving length of heat-sealable material wherein the heat sealed regions are rapidly cooled after the seal is formed comprising an endless belt of heat transfer material of low thermal conductivity, means for supporting and for revolving said belt, a plurality of heater bar members, means for heating said heater bar members, means for moving said heater bar members in sequence into contact with respective spaced areas of the inside face of said revolving heat-transfer belt and for withdrawing said heater bar members away from contact therewith for heating said spaced areas of said belt, means for feeding the heat-sealable material along adjacent to the outside face of said revolving belt for the heated areas of said belt to heat correspondingly spaced regions of said material up to sealing temperature, a plurality of chilling bar members, means for cooling said chilling bar members, and means for moving said chilling bar members in sequence into contact with said respective spaced areas of the inside face of said revolving belt while said belt engages said material for cooling the sealed regions thereof.

References Cited

UNITED STATES PATENTS

| | | | |
|---|---|---|---|
| 2,106,740 | 2/1938 | Hepke | 156—498 X |
| 2,326,931 | 8/1943 | Dalton et al. | 93—8 |
| 2,466,735 | 4/1949 | Piazze | 156—311 X |
| 2,469,972 | 5/1949 | Lowry | 156—311 X |
| 2,582,581 | 1/1952 | Bona | 156—282 X |
| 2,676,642 | 4/1954 | Bergstein et al. | 156—282 X |
| 2,796,914 | 6/1957 | Park | 156—311 X |
| 3,050,916 | 8/1962 | Gausman et al. | |
| 3,059,690 | 10/1962 | Nyborg | 156—498 |

FOREIGN PATENTS 1,238,103   6/1960   France.

TRAVIS S. McGEHEE, *Primary Examiner.*

EARL M. BERGERT, FRANK E. BAILEY,
*Examiners.*

W. M. COHEN, C. B. COSBY, *Assistant Examiners.*